(12) United States Patent
Sung et al.

(10) Patent No.: US 10,462,705 B1
(45) Date of Patent: Oct. 29, 2019

(54) SYSTEMS AND METHODS FOR PREVENTING PREMATURE PROCESSING DURING BEAM FORMING

(71) Applicant: Sprint Spectrum LP, Overland Park, KS (US)

(72) Inventors: Sanghoon Sung, Ashburn, VA (US); Udit Thakore, Fairfax, VA (US); Tri Duong, Annandale, VA (US); Dhaval Mehta, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 292 days.

(21) Appl. No.: 14/710,885

(22) Filed: May 13, 2015

(51) Int. Cl.
| | |
|---|---|
| *H04W 28/00* | (2009.01) |
| *H04W 28/18* | (2009.01) |
| *H04W 16/28* | (2009.01) |
| *H04W 72/04* | (2009.01) |
| *H04W 24/08* | (2009.01) |

(52) U.S. Cl.
CPC ........... *H04W 28/18* (2013.01); *H04W 16/28* (2013.01); *H04W 24/08* (2013.01); *H04W 72/042* (2013.01)

(58) Field of Classification Search
CPC ..... H04W 28/18; H04W 16/28; H04W 24/08; H04W 72/042
See application file for complete search history.

(56) References Cited

U.S. PATENT DOCUMENTS

| | | | | |
|---|---|---|---|---|
| 5,239,667 A | * | 8/1993 | Kanai | H04W 36/30 455/10 |
| 6,240,124 B1 | * | 5/2001 | Wiedeman | H04B 7/18534 370/318 |
| 7,453,854 B2 | * | 11/2008 | Fujishima | H04B 7/0408 370/328 |
| 8,116,675 B2 | | 2/2012 | Lee et al. | |
| 8,160,831 B1 | * | 4/2012 | Rausch | H01Q 1/1257 342/359 |
| 8,259,672 B2 | * | 9/2012 | Hochwald | H04B 7/0617 370/315 |
| 8,543,150 B2 | * | 9/2013 | Choi | H04B 7/024 370/252 |
| 9,253,704 B1 | * | 2/2016 | Sarkar | H04W 36/00 |
| 9,560,545 B1 | * | 1/2017 | Zhou | H04W 28/0252 |
| 2004/0023693 A1 | * | 2/2004 | Okawa | H04W 36/12 455/562.1 |
| 2005/0096102 A1 | * | 5/2005 | Mock | H04W 52/265 455/574 |
| 2006/0046738 A1 | * | 3/2006 | Guan | H04L 1/0026 455/452.2 |
| 2006/0142004 A1 | * | 6/2006 | He | H04W 48/16 455/434 |

(Continued)

*Primary Examiner* — Jeffrey M Rutkowski
*Assistant Examiner* — Jonathan Wood

(57) ABSTRACT

Systems and methods are described for preventing premature processing during beam forming. It may be determined, at an access node, that a wireless device has received data using a beam formed transmission from the access node. A gap may be calculated between a reported signal level for the wireless device and a transmission scheme used to transmit downlink data to the wireless device. A threshold value may then be adjusted based on the calculated gap, where the threshold value is used to determine when the wireless device scans a plurality of frequency bands. The adjusted threshold value may be transmitted to the wireless device.

14 Claims, 8 Drawing Sheets

(56) References Cited

U.S. PATENT DOCUMENTS

| | | | |
|---|---|---|---|
| 2006/0209753 A1* | 9/2006 | Patel | H04W 48/16 370/329 |
| 2006/0264180 A1* | 11/2006 | Qiu | H04L 1/0003 455/69 |
| 2008/0056414 A1* | 3/2008 | Kim | H04B 7/063 375/347 |
| 2008/0219376 A1* | 9/2008 | Qi | H04B 7/0417 375/285 |
| 2009/0041150 A1* | 2/2009 | Tsai | H04B 1/59 375/267 |
| 2009/0316591 A1* | 12/2009 | Reial | H04L 1/0023 370/252 |
| 2010/0112952 A1* | 5/2010 | Molnar | H01Q 1/246 455/63.1 |
| 2010/0279702 A1* | 11/2010 | Kazmi | H04B 7/0817 455/452.2 |
| 2011/0051012 A1* | 3/2011 | Miyazaki | H04N 21/235 348/731 |
| 2011/0246116 A1* | 10/2011 | Kamitani | G01S 7/4865 702/97 |
| 2012/0028671 A1* | 2/2012 | Niu | H04L 1/0003 455/522 |
| 2012/0106346 A1* | 5/2012 | Aguirre | H04W 28/08 370/237 |
| 2012/0236752 A1* | 9/2012 | Hu | H04L 25/0228 370/252 |
| 2013/0083679 A1* | 4/2013 | Krishnaswamy | G08G 1/093 370/252 |
| 2013/0156008 A1 | 6/2013 | Dinan | |
| 2013/0229971 A1* | 9/2013 | Siomina | H04W 24/10 370/312 |
| 2013/0244664 A1* | 9/2013 | Song | H04W 36/0083 455/437 |
| 2013/0329772 A1* | 12/2013 | Wernersson | H01Q 3/00 375/219 |
| 2014/0004897 A1* | 1/2014 | Jung | H04W 72/082 455/509 |
| 2014/0071838 A1* | 3/2014 | Jia | H04B 7/04 370/252 |
| 2014/0106740 A1* | 4/2014 | Zhou | H04W 24/10 455/423 |
| 2014/0140230 A1* | 5/2014 | Wen | H04W 40/12 370/252 |
| 2014/0146863 A1* | 5/2014 | Seol | H04B 7/0456 375/224 |
| 2014/0198681 A1* | 7/2014 | Jung | H04B 7/0617 370/252 |
| 2014/0233522 A1* | 8/2014 | Tokairin | H04L 1/0003 370/329 |
| 2014/0269859 A1* | 9/2014 | Hanson | H04B 1/40 375/219 |
| 2014/0347165 A1* | 11/2014 | Bremer | G06K 7/10217 340/10.1 |
| 2014/0349568 A1* | 11/2014 | Niemela | H04K 3/222 455/1 |
| 2014/0369435 A1* | 12/2014 | Kneckt | H04B 7/0413 375/267 |
| 2015/0004966 A1* | 1/2015 | Ayleni | H04W 36/0005 455/433 |
| 2015/0056985 A1* | 2/2015 | Swaminathan | H04W 88/06 455/432.1 |
| 2015/0105086 A1* | 4/2015 | Thiel | H04W 16/22 455/446 |
| 2015/0131461 A1* | 5/2015 | Ramkumar | H04W 52/0251 370/252 |
| 2015/0133173 A1* | 5/2015 | Edge | G01S 1/66 455/456.6 |
| 2015/0208420 A1* | 7/2015 | Kashiwase | H04L 5/001 370/230 |
| 2015/0222345 A1* | 8/2015 | Chapman | H04B 7/0617 370/332 |
| 2015/0229385 A1* | 8/2015 | Roos | H04B 7/18528 370/317 |
| 2015/0230263 A1* | 8/2015 | Roy | H04W 36/0083 455/452.2 |
| 2015/0264738 A1* | 9/2015 | Lee | H04W 76/18 370/228 |
| 2015/0319676 A1* | 11/2015 | Josan | H04B 17/20 455/434 |
| 2015/0358979 A1* | 12/2015 | Puranik | H04W 72/085 455/452.2 |
| 2015/0358989 A1* | 12/2015 | Ni | H04W 72/1226 370/330 |
| 2016/0095114 A1* | 3/2016 | Kim | H04W 74/0816 370/329 |
| 2016/0234078 A1* | 8/2016 | Jana | H04L 67/02 |
| 2016/0254886 A1* | 9/2016 | Bontu | H04L 1/0026 455/452.1 |
| 2016/0277968 A1* | 9/2016 | Ekemark | H04W 28/08 |
| 2016/0366697 A1* | 12/2016 | Andersson | H04L 5/0023 |
| 2016/0381609 A1* | 12/2016 | Alriksson | H04W 36/0083 370/331 |
| 2017/0127217 A1* | 5/2017 | Miao | H04W 4/003 |
| 2017/0201893 A1* | 7/2017 | Seol | H04W 16/28 |

* cited by examiner

SYSTEMS AND METHODS FOR PREVENTING PREMATURE PROCESSING DURING BEAM FORMING

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a network feature may change particular values used for network decisions. For example, a beam formed signal may complicate scanning decisions and handover decisions in the system. Accordingly, a system that effectively considers signal conditions caused by a beam formed signal may be able to provide a high quality service to users of the system.

OVERVIEW

Systems and methods are described for preventing premature processing during beam forming. It may be determined, at an access node, that a wireless device has received data using a beam formed transmission from the access node. A gap may be calculated between a reported signal level for the wireless device and a transmission scheme used to transmit downlink data to the wireless device. A threshold value may then be adjusted based on the calculated gap, where the threshold value is used to determine when the wireless device scans a plurality of frequency bands. The adjusted threshold value may be transmitted to the wireless device.

DETAILED DESCRIPTION

Systems and methods are described for preventing premature processing during beam forming. Based on the received signal levels for signals received at a wireless device from access nodes, the wireless device may begin scanning frequencies. For example, where received signal levels from two access nodes meet a criteria, the wireless device may begin to scan frequencies in preparation for a potential handover. In an embodiment, when the wireless device is receiving a beam formed transmission from an access node, the wireless device may scan frequencies prematurely. For example, a received signal level for a reference signal received at the wireless device from an access node (e.g., comprising a non-beam formed signal) may trigger frequency scanning prematurely. In another embodiment, the wireless device may be handed over from the access node that is transmitting the beam formed signal prematurely.

The system may implement a compensation for the beam formed signal. In an embodiment, a gap may be calculated based on a received signal level at the wireless devices and a transmission scheme from the access node. The gap may then be used to adjust the criteria used by the wireless device to determine when to scan frequencies. In another example, the gap may be used to adjust the criteria used to determine when the wireless device should be handed over from the serving access node. In an embodiment, the adjusted criteria may mitigate against some of the premature decisions in the system caused by a beam formed signal.

Figure 1:
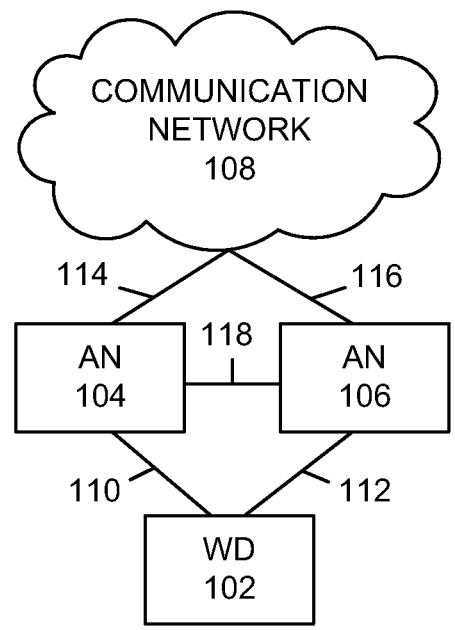
FIG. 1 illustrates an exemplary communication system to prevent premature processing during beam forming.

FIG. 1 illustrates an exemplary communication system 100 to prevent premature processing during beam forming comprising wireless devices 102, access nodes 104 and 106, communication network 108, and communication links 110, 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 104 and 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and can be, for example, a base transceiver station, a radio base station, and an eNodeB device. Access nodes 104 and 106 may communicate with communication network 108 over communication links 114 and 116 respectively. Access nodes 104 and 106 may also communicate directly with each other over communication link 118.

Although only access nodes 104 and 106 are illustrated in FIG. 1, wireless device 102 (and other wireless device not depicted) can be in communication with a plurality of access nodes and/or small cells. The plurality of access nodes and/or small cells can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116, and 118, can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2A:
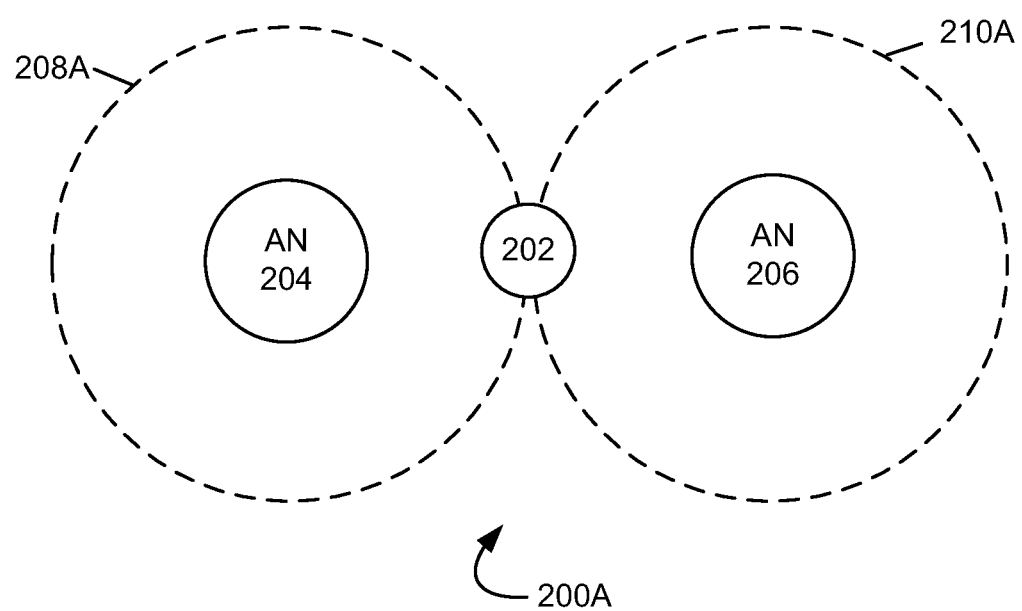
FIGS. 2A-2B illustrate exemplary systems to prevent premature processing during beam forming.
Figure 2B:
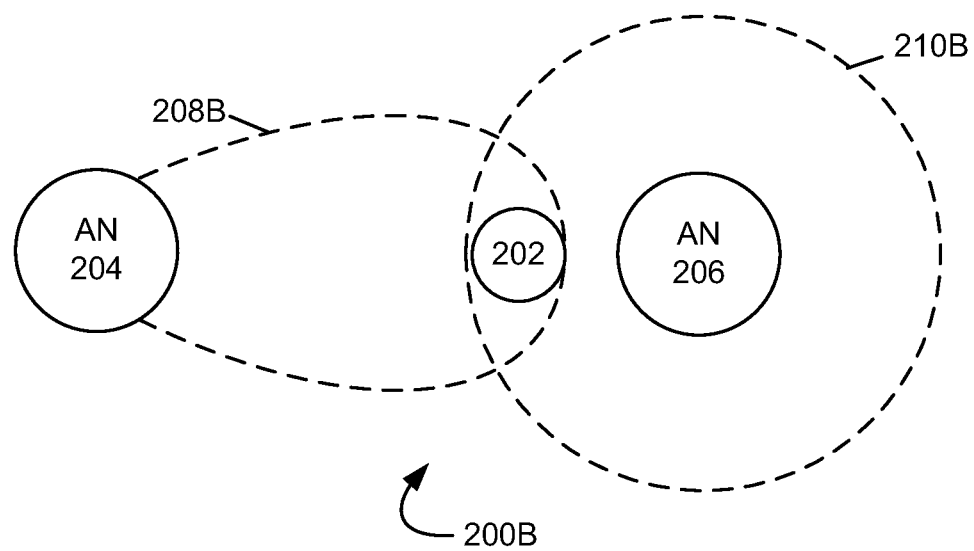

FIGS. 2A-2B illustrate exemplary communication systems 200A and 200B for preventing premature processing during beam forming. Systems 200A and 200B comprise wireless device 202, access nodes 204 and 206, signal areas 208A and 210A, and adjusted signal beams 208B and 210B. Wireless device 202 may comprise a device similar to wireless device 102. Access nodes 204 and 206 may comprise access nodes similar to access nodes 104 and 106.

In operation, access node 204 may establish communication with wireless device 202 such that access node 204 provides the wireless device access to a communication network (e.g., communication network 110). Signal areas 208A and 210A may comprise areas around each of access nodes 204 and 206 where a wireless device may detect wireless signals transmitted from the access node at a signal level above a threshold. For example, signal areas 208A and 210A may comprise coverage areas for access nodes 204 and 206 respectively, such that wireless devices that fall within the signal areas may be provided wireless services by the respective access node.

In an embodiment, systems 200A and 200B may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, systems 200A and 200B may leverage beam forming to enhance the wireless services provided to wireless device 202. For example, wireless device 202 may be located at the edge of signal area 208A. Accordingly, the wireless device may comprise a low channel quality (e.g., a channel quality indicator (CQI) below a threshold). The low channel quality may be based on a high interference level for the signals received by wireless device 202, or other suitable factors. In an embodiment, access node 204 may perform beam forming such that a signal transmitted to wireless device 202 is adjusted based on the location of the wireless device. For example, an adjusted beam 208B may be transmitted from access node 204 such that wireless device 202 may experience greater channel quality when communicating with access node 204. In an embodiment, the adjusted beam 208B may comprise of signals transmitted over a frequency band assigned to wireless device 202 (e.g., assigned as the frequency band that access node 204 uses to communicate with wireless device 202).

In an embodiment, beam forming may be accomplished using a plurality of antennas at access node 204 that implement, for example, a multiple input multiple output (MIMO) protocol. The signals from each of the plurality of antennas may be controlled such that the net signal from the access node may be transmitted towards wireless device 202 as a beam formed signal. In an embodiment, the beam may be formed by weighing the magnitude and/or phase of the signals transmitted by each individual antenna. For example, the signals may be weighed such that the emitted waveform from the antennas experiences constructive interference in the direction of wireless device 202 and destructive interference in other directions (e.g., away from wireless device 202). In another example, the signals may be weighed such that the emitted waveform from the antennas experiences destructive interference in the direction of wireless device 202. System 200B shows access node 204 adjusting a beam emitted by the access node towards wireless device 202. For example, adjusted signal beam 208B may be narrowed towards the location of wireless device 202.

In an embodiment, when wireless device 202 receives a beam formed signal from access node 204, the beam formed signal may cause premature scanning at the wireless device. For example, when wireless device 202 is receiving a beam formed transmission from access node 204 (e.g., beam formed signal 208B), the wireless device may scan frequencies prematurely. This is because a received signal level for a reference signal received at wireless device 202 from access node 204 (e.g., comprising a non-beam formed signal) may trigger frequency scanning prematurely. In another embodiment, wireless device 202 may be handed over from access node 204 prematurely. Accordingly, a system that effectively considers signal conditions caused by a beam formed signal may be able to provide a high quality service to users of the system.

Figure 3:
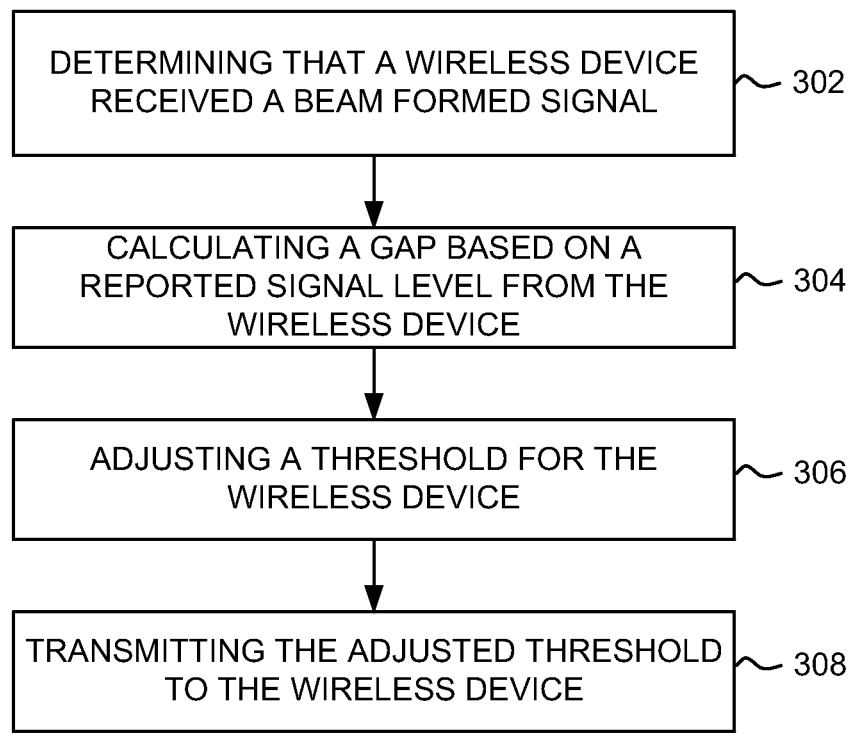
FIG. 3 illustrates an exemplary method of for preventing premature processing during beam forming.

FIG. 3 illustrates an exemplary method for preventing premature processing during beam forming. The method will be discussed with reference to the exemplary communication systems 200 and 200B illustrated in FIGS. 2A and 2B, however, the method can be implemented with any suitable communication system.

Referring to FIG. 3, at step 302, it may be determined, at an access node, that a wireless device has received data using a beam formed transmission from the access node. For example, it may be determined that wireless device 202 received data using a beam formed signal (e.g., beam formed signal 208B) from access node 204.

At step 304, a gap may be calculated between a reported signal level for the wireless device and a transmission scheme used to transmit downlink data to the wireless device. For example, a gap may be calculated based on the received signal level reported by wireless device 202 and a transmission used by access node 204 when transmitting the beam formed signal (e.g., beam formed signal 208B). In an embodiment, the reported received signal level may correspond to a reference signal received at wireless device 202 from access node 204 (e.g., RSRP), where the reference signal does not comprise a beam formed signal.

At step 306, a threshold value may be adjusted based on the calculated gap, where the threshold value is used to determine when the wireless device scans a plurality of frequency bands. For example, wireless device 202 may use a criteria that includes a threshold to determine when to scan frequencies (e.g., in preparation for a handover). In an embodiment, the threshold may be adjusted based on the gap calculated at access node 204.

At step 308, the adjusted threshold may be transmitted to the wireless device. For example, the threshold may be adjusted at access node 204 and may subsequently be transmitted to wireless device 202. In an embodiment, wireless device 202 may use the adjusted threshold to determine when to scan frequencies (e.g., in preparation for a handover).

Figure 4:
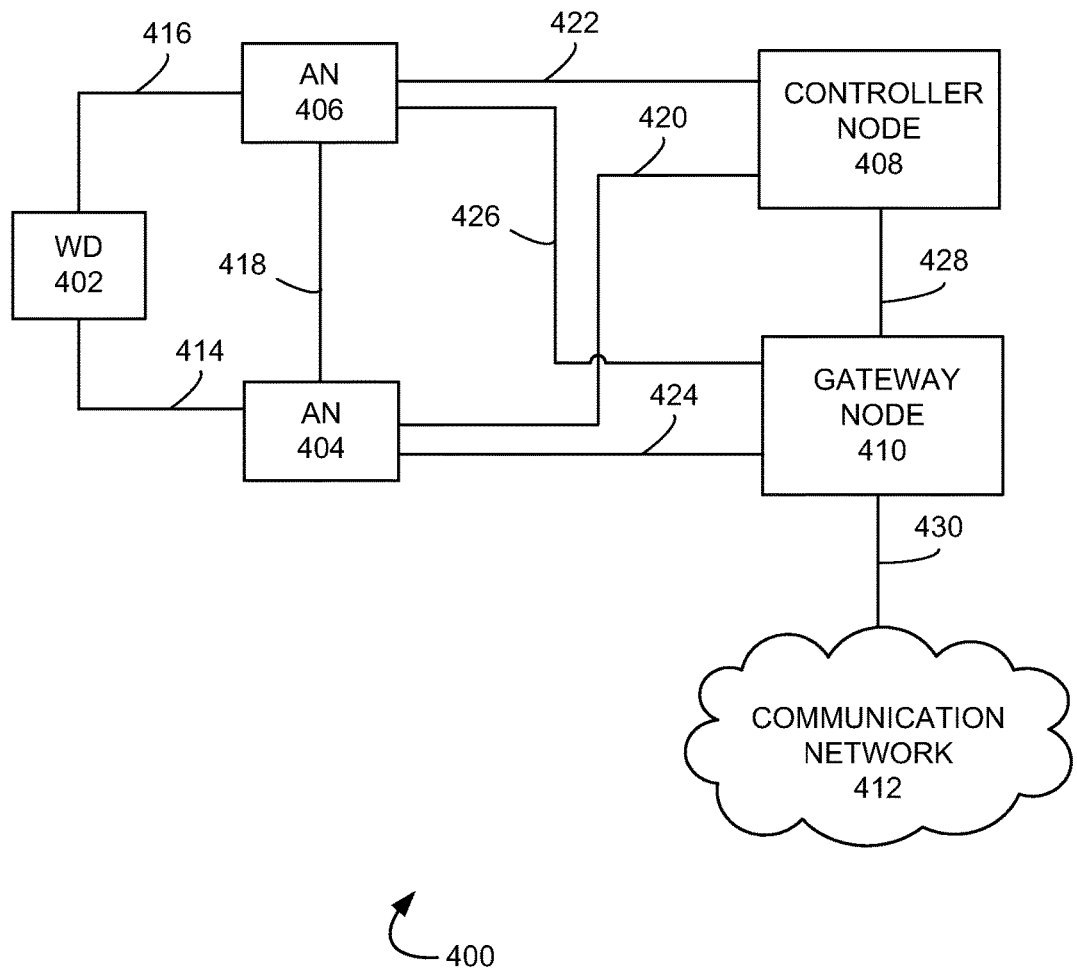
FIG. 4 illustrates another exemplary system to prevent premature processing during beam forming.

FIG. 4 illustrates another exemplary communication system 400 to prevent premature processing during beam forming. Communication system 400 may comprise wireless device 402, access nodes 404 and 406, controller node 408, gateway node 410, communication network 412, and communication links 414, 416, 418, 420, 422, 424, 426, 428, and 430. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, or an eNodeB device. In an embodiment, access node 404 can comprise a serving access node for wireless device 402. Access nodes 404 and 406 may communicate with controller node 408 over communication links 420 and 422, respectively, and with gateway node 410 over communication links 424 and 426, respectively. Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and a combination thereof.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and a combination thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 404 and 406, controller node 408, gateway node 410, and communication network 412 which are omitted for clarity, including additional processing nodes, routers, gateways, and physical and/or wireless data links for carrying data among the various network elements. In an embodiment, any of controller node 408, gateway node 410, and one or more modules of access nodes 404 and/or 406 may perform all or parts of the methods of FIGS. 3 and 5.

In operation, access node 404 may establish communication with wireless device 402 such that access node 404 provides the wireless device access to a communication network (e.g., communication network 412). Access nodes 404 and 406 may also comprise signal areas (e.g., similar to signal areas 208A and 210A of FIG. 2). In an embodiment, system 400 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, system 400 may leverage beam forming to enhance the wireless services provided to wireless device 402. For example, wireless device 402 may be located at the edge of a signal area for access node 404. Accordingly, the wireless device may comprise a low channel quality (e.g., a channel quality indicator (CQI) below a threshold). The low channel quality may be based on a high interference level for the signals received by wireless device 402, or other suitable factors. In an embodiment, access node 404 may perform beam forming such that a signal transmitted to wireless device 402 is adjusted based on the location of the wireless device. For example, an adjusted beam may be transmitted from access node 404 such that wireless device 402 may experience greater channel quality when communicating with access node 404. In an embodiment, the adjusted beam may be similar to adjusted beam 208B of FIG. 2.

In an embodiment, beam forming may be accomplished using a plurality of antennas at access node 404 that implement, for example, a multiple input multiple output (MIMO) protocol. The signals from each of the plurality of antennas may be controlled such that the net signal from the access node may be transmitted towards wireless device 402 as a beam formed signal. In an embodiment, the beam may be formed by weighing the magnitude and/or phase of the signals transmitted by each individual antenna. For example, the signals may be weighed such that the emitted waveform from the antennas experiences constructive interference in the direction of wireless device 402 and destructive interference in other directions (e.g., away from wireless device 402). In another example, the signals may be weighed such that the emitted waveform from the antennas experiences destructive interference in the direction of wireless device 402.

In an embodiment, when wireless device 402 receives a beam formed signal from access node 404, the beam formed signal may cause premature scanning at the wireless device. For example, when wireless device 402 is receiving a beam formed transmission from access node 404, the wireless device may scan frequencies prematurely. This is because a received signal level for a reference signal received at wireless device 402 from access node 404 (e.g., comprising a non-beam formed signal) may trigger frequency scanning prematurely. In another embodiment, wireless device 402 may be handed over from access node 404 prematurely. Accordingly, a system that effectively considers signal conditions caused by a beam formed signal may be able to provide a high quality service to users of the system.

Figure 5:
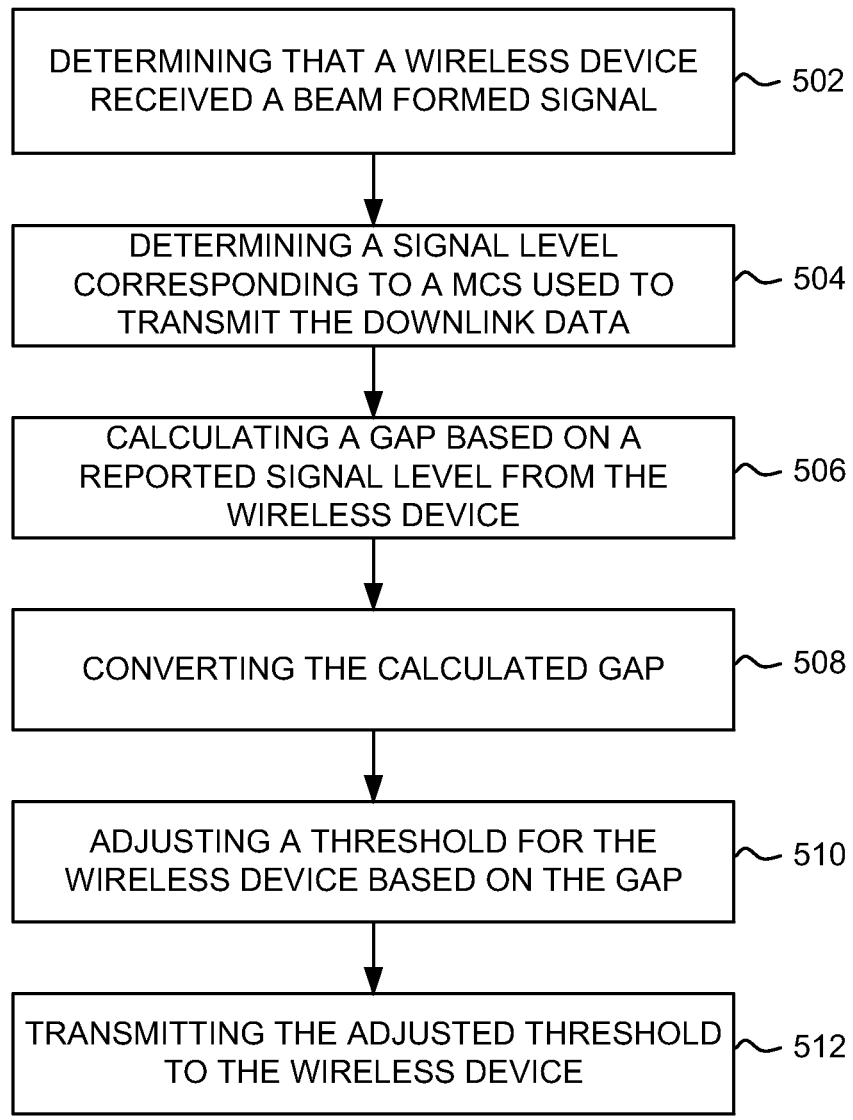
FIG. 5 illustrates another exemplary method of for preventing premature processing during beam forming.

FIG. 5 illustrates an exemplary method for preventing premature processing during beam forming. The method will be discussed with reference to the exemplary communication system 400 illustrated in FIG. 4, however, the method can be implemented with any suitable communication system.

Referring to FIG. 5, at step 502, it may be determined, at an access node, that a wireless device has received data using a beam formed transmission from the access node. For example, it may be determined that wireless device 402 received data using a beam formed signal from access node 404.

In an embodiment, access node 404 may compare a transmission mode for wireless device 402 to a transmission mode criteria. For example, where a transmission mode for wireless device 402 comprises transmission mode 8 or higher, it may be determined that the wireless device receives data using a beam formed transmission.

At step 504, a signal level may be determined that corresponds to a modulation and coding scheme used to transmit downlink data to the wireless device. For example, a signal level may be determined at access node 404 that corresponds to a modulation and coding scheme used to transmit downlink data from access node 404 to wireless device 402. The modulation and coding scheme may be used for a beam formed downlink transmission to wireless device 402. In an embodiment, the determined signal level may comprise a CQI (e.g., channel quality indicator). For example, a table known in the art may be accessed to determine a CQI corresponding to the modulation and coding scheme used in the downlink transmission.

A modulation and coding scheme may comprise a modulation scheme (e.g., QPSK, 8QAM, 16QAM, 32QAM, 64QAM, and the like) and a coding bit rate. A bit rate may indicate a number of redundant bits in a transmission (e.g., number of redundant bits used for error correction at the receiver, and the like). Here, the combination of the modulation scheme and the bit rate may comprise a spectral efficiency for the transmission. In an embodiment, the enhanced channel quality provided by a beam formed transmission may enable the beam formed transmission to a wireless device to use a modulation and coding scheme with an increased spectral efficiency (e.g., relative to a non-beam formed transmission).

At step 506, a gap may be calculated between a reported signal level for the wireless device and a transmission scheme used to transmit downlink data to the wireless device. For example, a gap may be calculated based on the received signal level reported by wireless device 402 and a transmission used by access node 404 when transmitting the beam formed signal.

In an embodiment, the reported received signal level for wireless device 402 may correspond to a reference signal received at wireless device 402 from access node 404 (e.g., RSRP), where the reference signal does not comprise a beam formed signal. For example, when access node 404 transmits a beam formed signal to wireless device 402 (e.g., transmission mode 8 or higher), the beam formed signal may comprise data carrier signals. A reference signal transmitted by access node 404 and received at wireless device 402 may not comprise a beam formed signal. Accordingly, a RSRP at wireless device 402 for access node 404 may not adequately represent a received signal level (e.g., SINR level) for data carrier signals received at wireless device 402 from access node 404.

In an embodiment, a gap may be calculated by calculating the difference between the determined signal level corresponding to the modulation and coding scheme used to transmit the downlink data to wireless device 402 and the reported signal level from wireless device 402. For example, the reported signal level from wireless device 402 may comprise a channel quality indicator (e.g., CQI). The reported CQI may be based on the cell specific reference signal from access node 404 that does not comprise a beam formed transmission. The determined signal level corresponding to the modulation and coding scheme used to transmit the downlink data (e.g., beam formed signal) may also comprise a CQI corresponding to the modulation and coding scheme for the transmission. Accordingly, the gap may comprise the difference between the CQI reported by wireless device 402 and the CQI corresponding to the modulation and coding scheme for a transmission to wireless device 402 from access node 404 (e.g., a beam formed transmission).

At step 508, the calculated gap may be converted to a signal gap. For example, the gap calculated (e.g., gap between the reported CQI for wireless device 402 and the CQI corresponding to a modulation and coding scheme for a transmission to wireless device 402 from access node 404) may be converted to a signal level gap (e.g., SINR level gap). In an embodiment, the calculated gap to may comprise a CQI gap, and the CQI gap may be converted to a signal level (e.g., SINR level) gap.

The calculated gap may be converted to a signal level based on a conversion algorithm. For example, a predefined algorithm may be used to convert a CQI difference into a SINR level difference. In another example, the calculated gap may be converted to a signal level gap based on a table. For example, a link table known in the art may provide for a conversion between a CQI difference and a SINR level difference.

At step 510, a threshold value may be adjusted based on the converted signal gap, where the threshold value is used to determine when the wireless device scans a plurality of frequency bands. For example, wireless device 402 may use a criteria that includes a threshold value to determine when to scan frequencies (e.g., in preparation for a handover). In an embodiment, the threshold value may be adjusted based on the converted signal gap. For example, the converted signal gap may be subtracted from the threshold value.

In an embodiment, the threshold value may comprise a value used during an A2 event from the LTE 3GPP protocol. For example, an A2 event may be used to determine when a wireless device should begin scanning a plurality of frequencies (e.g., in preparation for a handover). The A2 event comprises a comparison between a received signal level for a signal from an access node (e.g., a cell specific reference signal) and a threshold. In an embodiment, the threshold value may comprise an A2 reporting event threshold, such that a received reference signal level for a signal received at wireless device 402 from access node 404 is compared to the threshold value in order to determine when the wireless device scans the plurality of frequency bands for received signal levels associated with one or more second access nodes (e.g., access node 406).

During beam forming, the measurement used for the A2 event (e.g., the received signal level for a cell specific reference signal) may be a received signal level for a non-beam formed transmission. Accordingly, during beam forming, an A2 event may prematurely trigger frequency scanning. In an embodiment, the threshold used in the A2 event comparison may be adjusted, such that the converted signal gap is subtracted from the A2 event threshold. This adjustment may mitigate against premature scanning at the wireless device.

At step 512, the adjusted threshold may be transmitted to the wireless device. For example, the threshold value may be adjusted at access node 404 and may subsequently be transmitted to wireless device 402. In an embodiment, wireless device 402 may use the adjusted threshold value to determine when to scan frequencies (e.g., in preparation for a handover). For example, the adjusted threshold value may comprise an A2 event threshold value.

In an embodiment, the adjusted threshold may be transmitted to wireless device 402 in response to a request to scan a plurality of frequencies received from wireless device 402 at access node 404. For example, wireless device 402 may request a window of time with access node 404 over which the wireless device may scan a plurality of frequencies (e.g., in preparation for a handover). The adjusted threshold may be transmitted to wireless device 402 in response to the request. In another embodiment, the method of FIG. 5 may be initiated by the received request.

In an embodiment, the request may be granted when the reported signal level is less than or equal to the adjusted threshold value. For example, the request may be granted when the reported signal level (e.g., CQI) from wireless device 402 is less than the adjusted threshold value (e.g., the adjusted A2 event threshold value).

Figure 6:
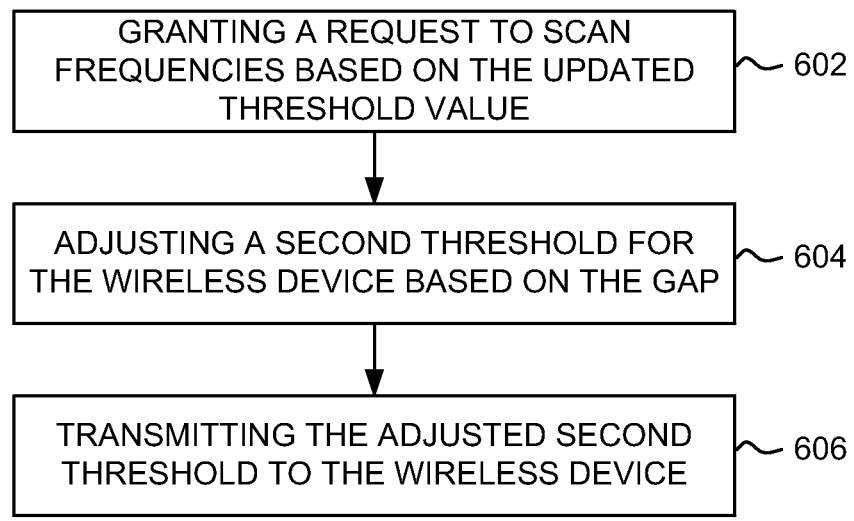
FIG. 6 illustrates another exemplary method of for preventing premature processing during beam forming.

FIG. 6 illustrates an exemplary method for preventing premature processing during beam forming. In an embodiment, the method of FIG. 6 may be triggered by the method of FIG. 5. For example, the method of FIG. 6 may be performed after the method of FIG. 5. The method will be discussed with reference to the exemplary communication system 400 illustrated in FIG. 4, however, the method can be implemented with any suitable communication system.

Referring to FIG. 6, at step 602 the access node may grant a request to scan for frequencies sent from the wireless device, where the request is based on the adjusted threshold value. For example, access node 404 may receive a request from wireless device 402 to scan for frequencies, where the transmission of the request was triggered from wireless device 402 based on the adjusted threshold value. In an embodiment, the adjusted threshold value may comprise a threshold value for an A2 event, and the request from wireless device 402 may be based on the A2 event and the adjusted threshold value.

In an embodiment, access node 404 may grant the request when it is determined that the access node previously transmitted the adjusted threshold value to wireless device 202. If it is determined that access node 404 previously transmitted the adjusted threshold to wireless device 402, it may be determined that the currently received request may be based on the adjusted threshold value (e.g., the triggering of an A2 event based on the adjusted threshold value).

At step 604, a second threshold value may be adjusted based on the converted signal gap, where the second threshold value is used to determine when the wireless device should perform a handover from the serving node. For example, wireless device 402 may use a criteria that includes a second threshold value to determine when the wireless devices should perform a handover from access node 404 to a new access node (e.g., access node 406). In an embodiment, the second threshold value may be adjusted based on the converted signal gap. For example, the converted signal gap may be subtracted from the second threshold value.

In an embodiment, the second threshold value may comprise a value used during one or more of an A3 event, A5 event, or B2 event from the LTE 3GPP protocol. For example, the A3, A5, and B2 events may be used to determine when a wireless device should perform a handover form the serving access node. The A3, A5, and B2 events comprise at least a comparison between a received signal level for a signal from an access node (e.g., a cell specific reference signal) and a threshold. In an embodiment, the second threshold value may comprise one of an A3, A5, or B2 reporting event threshold, such that a received reference signal level for a signal received at wireless device 402 from access node 404 is compared to the threshold value in order to determine when the wireless device is to be handed over to the second access node (e.g., access node 406).

During beam forming, one of the measurements levels used for the A3, A5, and B2 events (e.g., the received signal level for a cell specific reference signal) may be a received signal level for a non-beam formed signal. Accordingly, during beam forming, one or more of the A3, A5, and B2 events may prematurely trigger a handover from the serving access node. In an embodiment, a second threshold values used in the comparisons for one or more of the A3, A5, and B2 events may be adjusted, such that the converted signal gap is subtracted from the second threshold value. This adjustment may mitigate against premature handover of the wireless device.

At step 606, the adjusted second threshold may be transmitted to the wireless device. For example, the second threshold value may be adjusted at access node 404 and may subsequently be transmitted to wireless device 402. In an embodiment, the adjusted second threshold value may be used to determine when a handover of the wireless device should be performed. For example, the adjusted second threshold value may comprise one or more of a threshold for an A3, A5, or B2 event.

In an embodiment, after the second threshold value is transmitted to wireless device 402, a handover may be triggered based on the second threshold value. For example, one of the events A3, A5, or B2 may be triggered based on the second threshold value, and a handover of wireless device 402 from access node 404 to access node 406 may be performed. In an embodiment, the triggered event at wireless device 402 may be based on a received reference signal level associated with access node 404, a received reference signal level associated with access node 406, and the adjusted second threshold.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 7:
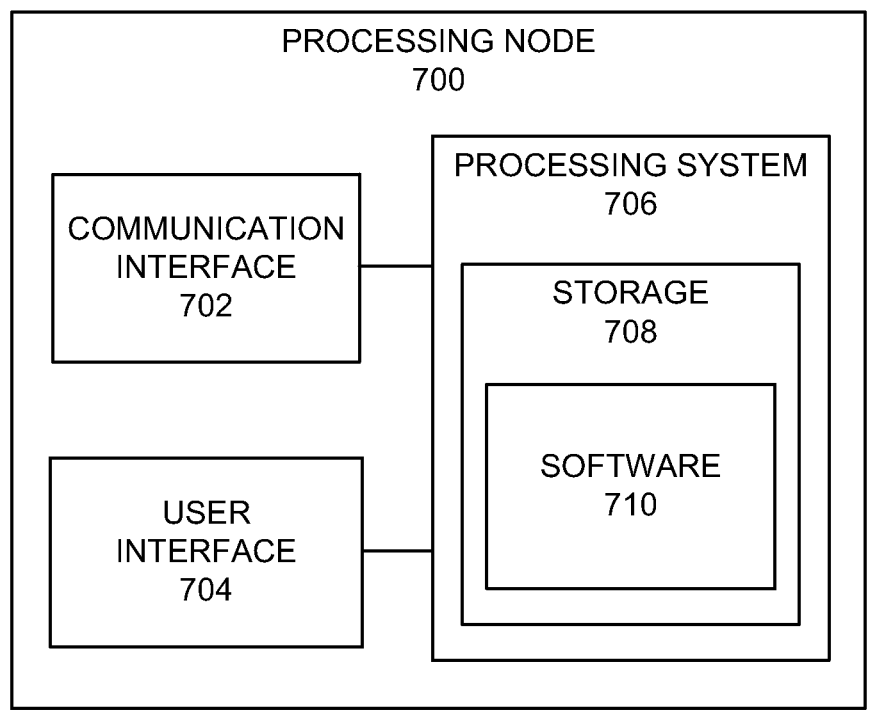
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 408 and gateway node 410. Processing node 700 can also be an adjunct or component of a network element, such as an element of access nodes 104 or 404 and the like. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for preventing premature processing during beam forming, the method comprising:

determining, at an access node, that a wireless device has received data using a beam formed transmission from the access node;

calculating a gap between a reported channel quality for the wireless device based on a non-beam formed reference signal and a channel quality indicator (CQI) based on a data transmission made with a modulation and coding scheme (MCS) transmission used to transmit downlink data to the wireless device using the beam formed transmission;

determining a signal level corresponding to the modulation and coding scheme;

converting the calculated gap to a signal level gap based on the determined signal level corresponding to the modulation and coding scheme;

adjusting a threshold value used to determine when the wireless device scans a plurality of frequency bands based on the calculated gap by subtracting the signal level gap from the threshold value; and transmitting the adjusted threshold value to the wireless device.

2. The method of claim 1, wherein the threshold value comprises an A2 reporting event threshold, such that a received reference signal level for a signal received at the wireless device from the access node is compared to the threshold value in order to determine when the wireless device scans the plurality of frequency bands for received signal levels associated with one or more second access nodes.

3. The method of claim 1, further comprising:
receiving, at the access node, a request from the wireless device to scan a plurality of frequency bands; and
transmitting the adjusted threshold value to the wireless device based on the received request.

4. The method of claim 3, further comprising granting the request when the reported signal level is less than or equal to the adjusted threshold value.

5. The method of claim 3, further comprising
adjusting a second threshold value used to determine when the wireless device is to be handed over to a second access node; and
transmitting the adjusted threshold value to the wireless device.

6. The method of claim 5, wherein the second threshold value comprises one of an A3, A5, and B2 reporting event threshold, such that a received reference signal level for a signal received at the wireless device from the access node is compared to the threshold value in order to determine when the wireless device is to be handed over to the second access node.

7. The method of claim 6, wherein adjusting the second threshold value comprises subtracting the signal level gap from the second threshold value.

8. A system for preventing premature processing during beam forming, the system comprising:
an access node with a processor configured to:
determine that a wireless device has received data using a beam formed transmission from the access node;
calculate a gap between a reported channel quality for the wireless device based on a non-beam formed reference signal and a channel quality indicator (CQI) based on a data transmission made with a modulation and coding scheme (MCS) transmission used to transmit downlink data to the wireless device using the beam formed transmission;
determine a signal level corresponding to the modulation and coding scheme;
convert the calculated gap to a signal level gap based on the determined signal level corresponding to the modulation and coding scheme;
adjust a threshold value used to determine when the wireless device scans a plurality of frequency bands based on the calculated gap by subtracting the signal level gap from the threshold value; and
transmit the adjusted threshold value to the wireless device.

9. The system of claim 8, wherein the threshold value comprises an A2 reporting event threshold, such that a received reference signal level for a signal received at the wireless device from the access node is compared to the threshold value in order to determine when the wireless device scans the plurality of frequency bands for received signal levels associated with one or more second access nodes.

10. The system of claim 8, wherein the access node is further configured to:
receive a request from the wireless device to scan a plurality of frequency bands; and
transmit the adjusted threshold value to the wireless device based on the received request.

11. The system of claim 10, wherein the access node is further configured to:
grant the request when the reported signal level is less than or equal to the adjusted threshold value.

12. The system of claim 10, wherein the access node is further configured to:
adjust a second threshold value used to determine when the wireless device is to be handed over to a second access node; and
transmit the adjusted threshold value to the wireless device.

13. The system of claim 12, wherein the second threshold value comprises one of an A3, A5, and B2 reporting event threshold, such that a received reference signal level for a signal received at the wireless device from the access node is compared to the threshold value in order to determine when the wireless device is to be handed over to the second access node.

14. The system of claim 13, wherein adjusting the second threshold value comprises subtracting the signal level gap from the second threshold value.

* * * * *